United States Patent Office 3,532,659
Patented Oct. 6, 1970

---

3,532,659
FLUORINATED ORGANIC COMPOUNDS AND POLYMERS THEREOF
Robert Bonner Hager and Arnold Harold Fainberg, King of Prussia, Pa., assignors to Pennsalt Chemicals Corporation, Philadelphia, Pa., a corporation of Pennsylvania
No Drawing. Filed Apr. 26, 1967, Ser. No. 634,437
Int. Cl. C08f 3/62, 15/18
U.S. Cl. 260—29.6    9 Claims

---

ABSTRACT OF THE DISCLOSURE

Polymerizable acrylates containing perfluoroalkyl tails, homopolymers and copolymers thereof, means for preparing these compositions, and methods of their use for treating textiles and related materials.

---

The invention is concerned particularly with polymers and copolymers of monomers derived from compounds having the structure

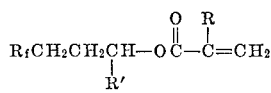

where $R_f$ is a perfluoroalkyl group containing from 5 to 13 carbon atoms, R is selected from the group consisting of hydrogen and methyl, and R' is a lower alkyl radical (1 to 5 carbon atoms), and their use for treating textiles and the like (e.g. paper, leather, etc.).

It is known that polymerizable acrylates containing long-chain perfluoroalkyl end groups of "tails" in the molecule provide polymers that have exceptional resistance to wetting by both aqueous and oleaginous systems. Such polymers exhibit both hydrophobic and oleophobic effects because of the perfluoroalkyl portion of the molecule. Polymers of such acrylates are particularly useful in the form of latices for surface treatment of textiles, paper, and other fiber substrates to impart water and oil repellency; thus, making these materials resistant to staining by both aqueous and oil soils.

These perfluorinated materials, however, are generally of high cost. Therefore, it is important that they be effective in minimal amounts and much work has been undertaken toward tailoring the monomer molecule so as to obtain maximum performance of the water and oil repellency properties of the polymers and copolymers which may be prepared therefrom. It has been observed that not only does the perfluorinated portion of the molecule (especially its chain length) have an important influence on these properties, but that the remaining portion of the monomer molecule also may influence the same properties to a significant degree. Just how the configuration of the molecule influences the overall oil and water repellency characteristics of the polymer is not understood. It is possible that the arrangement of the hydrocarbon portion can affect the orientation of the perfluoroalkyl tails on the surface of the polymer and in this manner may modify the surface characteristics even where the fluorocarbon portion is constant in size and configuration. Whatever the explanation is, it has been found impossible to predict in advance the effect of modifications in the monomer.

In accordance with the present invention, it has been discovered that certain novel acrylates derived from secondary alcohols provide polymers having remarkably superior surface properties as compared to similar acrylates which lack the branching in the hydrocarbon portion of the molecule. The branched acrylate polymers of the invention are particularly superior with respect to their oil repellent properties.

The monomeric acrylates of the invention have the structure shown above and the polymers, including homopolymers and copolymers, with other unethylenically unsaturated compounds, will contain the repeating unit of the following structure:

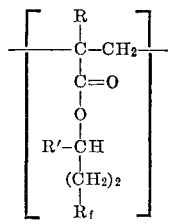

The acrylate monomer of the invention is prepared from the appropriate perfluoroalkyl iodide by a series of reactions which involves addition of 1 mole of ethylene to the iodide, which product ($R_fCH_2CH_2I$) is subsequently reacted with an alkali metal hydroxide (or other strong base) to obtain the corresponding substituted ethylene by elimination of HI. The substituted ethylene is converted to the secondary alcohol and this product is then reacted with the appropriate acyl chloride to yield the acrylate monomer. The following series of equations illustrate the method:

(a) $R_fI + H_2C{=}CH_2 \longrightarrow R_fCH_2CH_2I$ (b) $R_fCH_2CH_2I \xrightarrow{KOH} R_fCH{=}CH_2 + KI + H_2O$ (c) $R_fCH{=}CH_2 + R'{-}CH_2OH \longrightarrow R_fCH_2{-}CH_2{-}\underset{\underset{R'}{|}}{C}HOH$ (d)
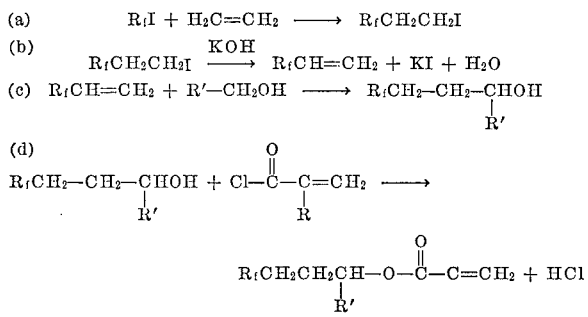

In the above equations $R_f$ is a straight or branched chain perfluoroalkyl group, R' is a lower alkyl group of from one to five carbon atoms (i.e. R'—$CH_2OH$ is ethanol, propanol and butanol) and R is hydrogen or methyl. The examples which follow illustrate the process.

EXAMPLE 1

Preparation of 4-(perfluoro-7-methyloctyl)-2-butanol

A 1-gallon stainless steel autoclave is charged with 500 g. 1 mole, of distilled(perfluoro-7-methyloctyl) ethylene (prepared as in above steps a and b, and see also U.S. Pat. 3,239,557), 14.8 g., 0.1 mole of di-tert-butyl peroxide, and 2000 ml. of absolute ethanol. The reaction mixture is heated to 122° for 24 hours with agitation. After cooling, the clear, colorless reaction mixture is stripped of ethanol to afford 548 g. of crude 4-(perfluoro-7-methyloctyl)-2-butanol. This crude material can be used directly for further synthesis or may be distilled to afford 410 g., 0.76 mole, 80% yield of pure $C_9F_{19}CH_2CH_2CH(CH_3)OH$, B.P. 72°/0.05 mm., M.P. 49°.

*Analysis.*—Calcd. for $C_{13}F_{19}H_9O$ (percent): C, 28.79; H, 1.67; F, 66.58. Found (percent): C, 28.98; H, 1.90; F, 66.56. The n.m.r. spectra (F and H) are in agreement with the assigned structure.

EXAMPLE 2

Preparation of 4-(perfluoro-7-methyloctyl)-2-butyl-methacrylate

A 2-liter flask equipped with a 12 x 1 inch packed column topped with a distilling head is charged with 548 g., 1.0 mole, of crude 4-(perfluoro-7-methyloctyl)-2-butanol from Example 1 and 700 ml. of xylene. Material is distilled off until the head temperature reaches 139°. The head is then replaced by a condenser and phase separator. To the flask is added 128 g., 1.5 moles, of methacrylic acid, 2.00 g. of hydroquinone, and 8.6 g. of p-toluenesulfonic acid monohydrate. The reaction mixture is heated to reflux for 9 hours during which time 17.9 g. 0.99 mole, of water is recovered. The xylene is stripped off under vacuum at 50°. The residue is taken up in 800 ml. of 1,1,2-trichlorotrifluoroethane and the resulting solution washed with 200 ml. portions of 10% NaOH until the extracts are no longer colored. After two water washes, the organic layer is dried over Drierite and filtered. Removal of the solvent under vacuum at 35° affords 483 g., 0.79 mole, of crude 4-(perfluoro-7-methyloctyl)-2-butyl methacrylate, yield 79%.

The crude monomer is satisfactory for the preparation of polymers or may be fractionated. Thus 323 g. of crude monomer affords 258 g. of pure

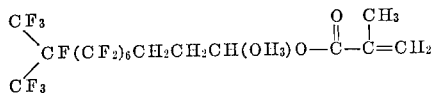

B.P. 78°/0.2 mm.

*Analysis.*—Calcd. for $C_{17}F_{19}H_{13}O_2$ (percent): C, 33.45; H, 2.14; F, 59.15. Found (percent): C, 33.51; H, 2.28; F, 60.17. Mass spectral and n.m.r. data are in satisfactory agreement with the proposed structure.

Using procedures similar those in Examples 1 and 2, the following monomers are obtained from the appropriate starting materials:

$$CF_3\!\!\diagdown\!\!CF(CF_2)_2CH_2CH_2CH(CH_3)O-\underset{\underset{\displaystyle O}{\|}}{C}-\underset{\underset{\displaystyle CH_3}{|}}{C}=CH_2$$
$$CF_3\!\!\diagup$$

B.P. 86°/5 mm.

*Analysis.*—Calcd. for $C_{13}F_{11}H_{13}O_2$ (percent): C, 38.06; H, 3.19; F, 50.94. Found (percent): C, 38.31; H, 3.36; F, 51.55. $N_D^{25}=1.3597$.

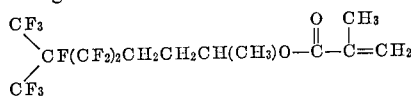

B.P. 80°/0.9 mm.

*Analysis.*—Calcd. for $C_{15}F_{15}H_{13}O_2$ (percent): C, 35.30; H, 2.56; F, 55.85. Found (percent): 35.69; H, 2.75; F, 55.90. $N_D^{25}=1.3539$.

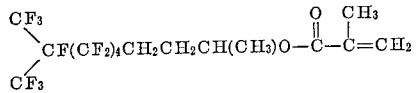

B.P. 88°/0.06 mm.

*Analysis.*—Calcd. for $C_{19}F_{23}H_{13}O_2$ (percent): C, 32.12; H, 1.84; F, 61.52. Found (percent): C, 32.25; H, 1.98; F, 61.35. $N_D^{25}=1.3475$.

EXAMPLE 3

In like manner, the following monomers are prepared and form part of this invention:

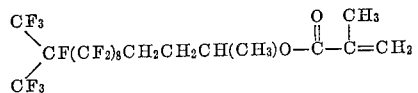

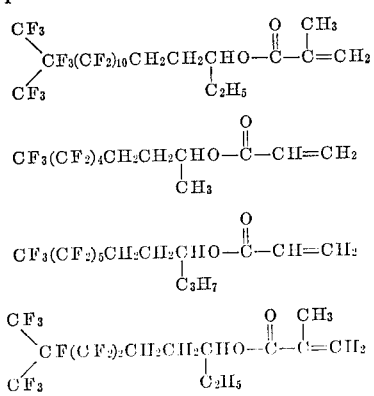

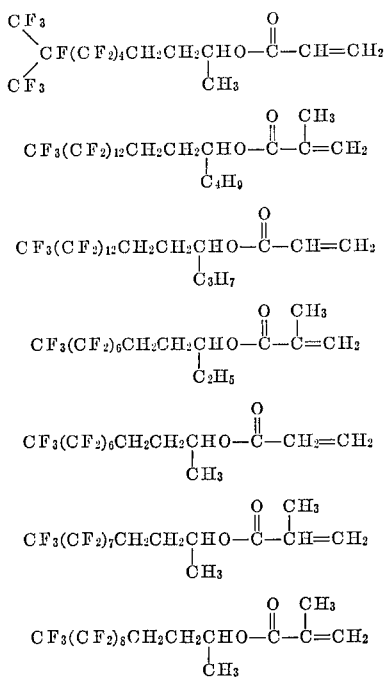

The acrylate monomers of the invention may be homopolymerized or copolymerized with other ethylenically unsaturated comonomers by conventional polymerization techniques which will include emulsion polymerization, suspension polymerization, solution polymerization, or bulk polymerization.

The preferred polymerization technique is emulsion polymerization in an aqueous medium. According to this technique, the monomer is charged to a polymerization vessel (preferably equipped with a stirrer or other type of agitator, heating and/or cooling means) together with water, which is preferably deoxygenated and deionized, a polymerization catalyst, and a surfactant to stabilize the emulsion such that the polymer is obtained in the form of an aqueous latex. If desired, other additives may be used in the polymerization recipe, such for example, as water soluble organic solvents, such as acetone, ethyl alcohol, methyl alcohol, ethylene glycol, and the like, chain transfer agents such as mercaptans, carbon tetrachloride, carbon tetrabromide, and the like, crosslinking monomers such as alkylene glycol dimethylacrylates, allyl methacrylate, divinylbenzene and the like, and inorganic salts such as chloride, acetates, carbonates, phosphates, and borates to serve as buffers and electrolytes.

Suitable polymerization catalysts include generally those commonly used for the polymerization of acrylic monomers such, for example, as potassium persulfate, ammonium persulfate, hydrogen peroxide, barium peroxide, sodium peroxide, or organic catalysts such as 2,2'-azodiisobutyramidine dihydrochloride, 2,2'-azodiisobutyronitrile, 2,2'-azobis(2,4-dimethyl - 4 - methoxyvaleronitrile, 2,2'-azodiisobutyramidoxime dihydrochloride, ditertiary butyl peroxide, tertiary butyl hydroperoxide, benzoyl peroxide, tertiary butyl peracetate, tertiary butyl perbenzoate, acetyl peroxide, 2,4-dichlorobenzo peroxide, disuccinic acid peroxide, cumene hydroperoxide, dicumyl peroxide, lauroyl peroxide, methyl ethyl ketone peroxide, (di(hydroxyheptyl) peroxide, and myristolyl peroxide. Such polymerization catalysts will generally be used in concentrations ranging between 0.01 and 3% and preferably between 0.1 and 2% by weight of the monomer.

Suitable surfactants or emulsifying agents include generally those of the cationic, anionic, nonionic, or amphoteric types. The nonionic types are generally preferred when the final product may be diluted with other ionic materials. However, the cationic types can be used in most textile treating baths and, in some cases, may be preferred due to their substantive effect on cellulose. The hydrophobic portion of the surfactant may be hydrocarbon or may be fluorinated. Suitable surfactants that may be used include, for example, nonionic surfactants in which the hydrophilic group is a poly(ethoxy) group and the hydrophobic portion is either a hydrocarbon or a fluorocarbon group such as the ethylene oxide condensates of alkyl phenols, alkanols, alkyl amines, alkyl thiols, alkyl carboxylic acids, fluoroalkyl carboxylic acids, fluoroalkyl amides, fluoroalkyl amines, fluoroalkyl thiols, and the like. Suitable nonionic surfactants include, e.g., those of the types

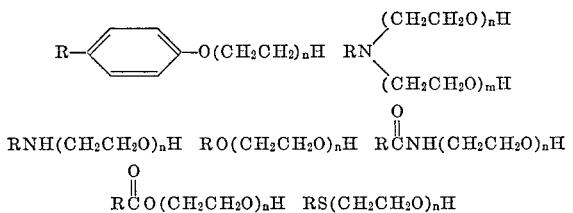

where R is an alkyl radical having 8 to 2 carbon atoms and $n$ and $m$ is an integer from 1 to 100; and those of the type

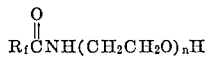

where $R_f$ is a perfluoroalkyl or perfluorochloroalkyl radical having from 4 to 18 carbon atoms and where $n$ is an integer from 1 to 50. Specific examples of suitable nonionic surfactants include, e.g.

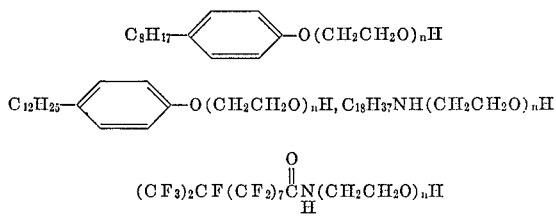

and

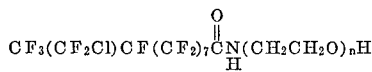

where $n$ is an integer having an average value of about 4 to 50.

Suitable anionic surfactants include, e.g., those in which the hydrophillic group is

—OSO$_3$M; —OPO$_4$M; —(CH$_2$CH$_2$O)$_n$SO$_3$M, where M is NH$_4$+, K+, Na+, or the like; and where the hydrophobic portion is a long chain alkyl group, higher alkyl substituted benzene or naphthalene group of a fluoroalkyl group having from 4 to 18 carbon atoms, such for example, as

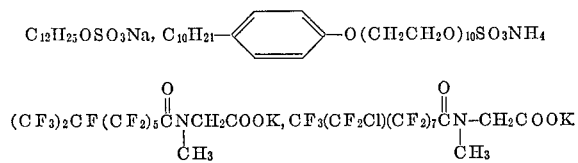

and (CF$_3$)$_2$CF(CF$_2$)$_7$COONH$_4$

Suitable cationic surfactants include, e.g., quaternary ammonium salts or amine salts containing at least one long chain alkyl, fluoroalkyl or higher alkyl substituted benzene or naphthalene group to provide the hydrophobic portion, such for example as

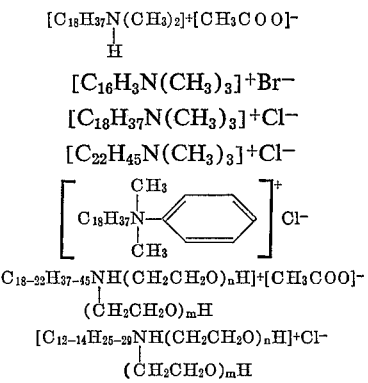

and

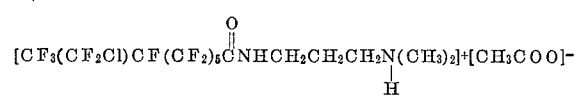

The polymerization is preferably carried out for a reaction period adjusted to obtain essentially quantitative conversion of the fluorinated acrylate monomer. The optimum reaction time will depend upon the catalyst used and the polymerization temperature and other conditions, but will generally be in the range of from 0.5 to 24 hours. The polymerization temperature will depend upon the catalyst chosen. In the case of emulsion polymerization in aqueous media it will generally be in the range of from 20° to 100° C. The polymerization is most conveniently and generally preferably carried out at atmospheric pressure.

Comonomers suitable for copolymerizing with the fluorinated acrylates of the invention include generally ethylenically unsaturated compounds particularly those containing a terminal ethylenic linkage. Suitable comonomers may include, for example, those containing relatively long-chain perfluoroalkyl groups. For instance, a mixture of two or more of the fluorinated sulfur containing acrylates of the invention which may differ from one another, e.g. in the length of the perfluoroalkyl chain, may be copolymerized. Similarly, the fluorinated secondary alcohol acrylates of the invention may be copolymerized with other monomers containing perfluoroalkyl chains such, for example, as

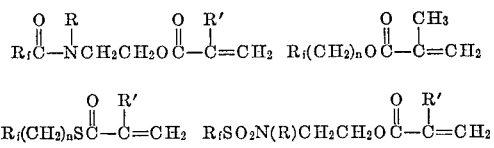

where $n$ is an integer from 1 to 6, $R_f$ is a perfluoroalkyl radical containing from 4 to 18 carbon atoms, R is alkyl of 1 to 10 carbon atoms, and where R' is H or CH$_3$.

Examples of other ethylenically unsaturated monomers suitable for copolymerization with the fluorine containing acrylates of the invention include butadienes such as 1,3-butadiene, 2-chloro-1,3-butadiene, 2-methyl-1,3-butadiene, 2,3-dichloro-1,3-butadiene; acrylic and methacrylic acids and their esters and amides such as methyl acrylate, methyl methacrylate, ethyl acrylate, ethyl methacrylate, butyl acrylate, butyl methacrylate, isobutylacrylate, isobutyl methacrylate, ethylbutyl methacrylate, hexyl acrylate, isoamyl acrylate and methacrylate, butoxyethyl acrylate and methacrylate, hexyl methacrylate, ethylhexyl acrylate, ethylhexyl methacrylate, 3,5,5 - trimethylhexyl acrylate and methacrylate, octyl acrylate, octyl methacrylate, decyl acrylate, decyl methacrylate, lauryl acrylate, lauryl methacrylate, tridecyl acrylate, tridecyl methacrylate, 2,6,8-trimethyl-4-nonyl methacrylate, stearyl acrylate, stearyl methacrylate, hydroxyethyl and hydroxypropyl methacrylate, t-butylaminoethyl methacrylate, dimethylaminoethyl methacrylate, 2-hydroxy-3-methacryloxyoxypropyltrimethylammonium chloride, glycidyl acrylate, glycidyl methacrylate, acrylamide, methacrylamide, N-methylol acrylamide, N-methylol methacrylamide, N-isopropyl acrylamide, N-isopropyl methacrylamide, and the like; vinyl halides such as vinyl chloride, vinyl fluoride, vinylidenechloride, vinylidene fluoride, tetrafluoroethylene, and the like; vinyl esters, such as vinyl acetate, vinyl butyrate, vinyl laurate, vinyl stearate, and the like; vinyl alkyl ketones such as vinyl methyl ketone, vinyl ethyl ketone, and the like; vinyl ethers such as methyl vinyl ether, cetyl vinyl ether, octadecyl vinyl ether, styrene, alkyl styrene, vinyl silicates, maleic anhydride, maleic acid and the esters and amides thereof; fumaric acid and the esters and amides thereof; itaconic acid and the esters and amides thereof; crotonic acid and the esters and amides thereof; allylamine, allyl alcohol, allyl esters and ethers, acrylonitrile and methacrylonitrile.

The copolymers of the fluorine containing acrylates with a fluorine free acrylate as described above are a preferred embodiment of the invention.

The following examples illustrate the homopolymerization of the acrylate monomers described above:

EXAMPLE 4

Homopolymerization of 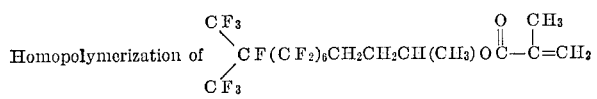

A solution of 2.5 g. of the above monomer in 1.6 g. of acetone is placed in a 7 oz. glass bottle. To this solution is added 0.1 g. 60% methaylolacrylamide, 7.5 g. of deoxygenated water, 0.12 g. cetyltrimethyl ammonium bromide, surfactant (Acetoquat CTAB), and 0.05 g. of 2,2′-azo-diisobutyramidine dihydrochloride. The bottle is filled with nitrogen, capped, and placed in a tumbler submerged in a constant temperature bath. After 4 hours at 70° a latex is obtained with virtually no precoagulum formation.

EXAMPLE 5

Homopolymerization of 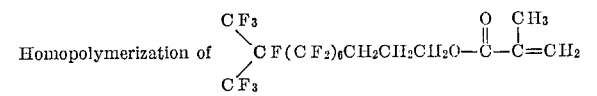

The same procedure as described in Example 4 for homopolymerization is used for the above monomer with the same results.

EXAMPLE 6

Homopolymerization of 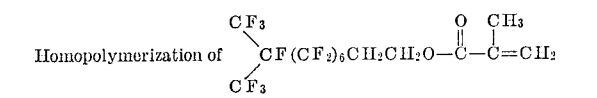

The same procedure as described in Example 4 for homopolymerization is used for the above monomer with the same results.

EXAMPLE 7

Homopolymerization of 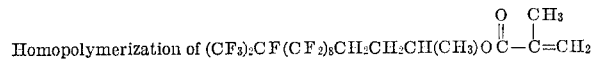

The same procedure as Example 4 is used but 0.12 g. of Ethomeen L15/15 and 0.08 g. glacial acetic acid are used in place of Acetoquat CTAB.

EXAMPLE 8

Homopolymerization of 

The same procedure as Example 7 is used to obtain this homopolymer.

EXAMPLE 9

Homopolymerization of (CF₃)₂CF(CF₂)₂CH₂CH₂CH(CH₃)O- 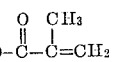

The same procedure as Example 7 is used for this homopolymer.

EXAMPLE 10

Homopolymerization of (CF₃)₂CFCH₂CH₂CH(CH₃)O- 

The same procedure as Example 7 is used.

The following examples illustrate the preparation of copolymers:

EXAMPLE 11

Copolymerization of (CF₃)₂CF(CF₂)₆CH₂CH₂CH(CH₃)O  and
n-decylmethacrylate The same procedure as Example 7 is used but 0.6 g. n-decyl methacrylate is added to the polymerization mass.

EXAMPLE 12

Copolymerization with n-tridecyl acrylate

The same procedure as Example 11 is used, except that 2.0 g. of fluorinated monomer and 0.5 g. tridecyl acrylate is used.

EXAMPLE 13

Copolymerization with octadecyl acrylate

The same procedure as Example 12 is used.

EXAMPLE 14

Copolymerization with octadecyl methacrylate

The same procedure as Example 12 is used.

EXAMPLE 15

The procedure of Example 7 is followed except that the polymerization is carried out with a mixture of the following fluorine containing acrylates:

|  | Percent by wt. |
|---|---|
| 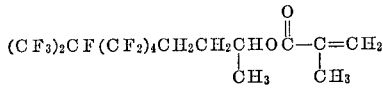 | 20 |
| 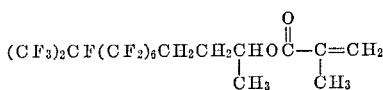 | 60 |
| 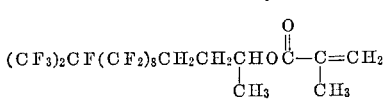 | 20 |

As already indicated, the polymers of the invention are highly effective for imparting oil and water repellent properties to substrates to which they are applied and coatings of these polymers may be prepared by any of the well-known techniques. When prepared by bulk or suspension polymerization techniques, these polymers may be applied, for example, from a dilute solution in suitable solvents such as the fluoroalkanes, fluorochloroalkanes, fluoroalkyl substituted aromatics, alkyl esters of perfluoroalkanoic acids, chlorinated alkanes or aromatics, hydrocarbon aromatics, ketones, esters, and ethers. Concentrations of the fluorinated polymer in the solvent to provide coatings with effective oil and water repellency properties will generally be of the order of 0.01 to 10% and preferably from 0.1 to 1.0% by weight. If the polymer is obtained as an aqueous latex or emulsion, the polymer coating may be applied by diluting the latex concentrate obtained from a polymerization with water or other liquid diluting agent to obtain a diluted latex or dispersion usually of the order of from 0.01 to 10% by weight of the polymer and preferably from 0.1 to 1.0% by weight based on the total weight of the diluted latex.

The polymer solution or latex may be applied by any of the known techniques such as by dipping, spraying, brushing, padding, roll coating or by any desired combination of such techniques. The optimum method of application will depend principally on the type of substrate being coated.

Coatings of the fluorinated polymers of the invention may be applied to any desired substrate, porous or non-porous. They are particularly suited for application to porous materials such as textiles, leather, paper, wood, masonry, unglazed porcelain and the like to provide valuable oil and water repellency properties. However, they may also be applied to non-porous materials such as metals, plastics, glass, painted surfaces and the like to provide similar oil and water repellency properties.

For application to textile materials such as fabrics (woven and non-woven), fibers, films, yarns, cut staple, thread, etc., or articles made from fabrics, fibers, films, yarns, etc., the polymers of the invention are preferably prepared as aqueous latices or emulsions which are then diluted, preferably with water, and applied to the textiles from pad baths, which may contain other treating materials. In accordance with this standard technique, the fabric or the textile material is passed through the bath, passed through squeeze rolls adjusted to leave the desired amount of the polymer latex on the fabric, dried at a temperature of about 25 to 170° C. and then cured in a curing oven at a temperature in the range of from 140 to 195° C. for 0.2 to 20 minutes. The weight of fluorinated monomer deposited on the fabric may range, for example, from 0.01 to 10%. Preferably, very small amounts are used, generally in the range of from 0.1 to 0.5% to give high degrees of water and oil repellency. Any types of textile materials, such as cotton, wool, fiber glass, silk, regenerated cellulose, cellulose esters, cellulose ether, polyesters, polyamides, polyolefins, polyacrylonitrile, polyacrylic esters, inorganic fibers, etc., either alone or blended in any combination, may be successfully coated with the fluorinated polymers of the invention.

It will be often advantageous to use the fluorinated acrylate homopolymers or copolymers of the invention in combination with other resins, polymers, crease-proofing agents, softeners, sizes, water repellents, etc. It is particularly advantageous to employ mixtures of emulsions of the fluorine-containing acrylate polymers or copolymers of the invention with separately prepared emulsions of other polymers or copolymers. The other polymer or copolymer is preferably of a non-fluorinated variety. Non-fluorinated polymers are copolymers suitable for admixture with the fluorinated polymers of the invention include, in particular, polymers and copolymers obtained from monomers of the alkyl acrylates and alkyl methacrylates, such as methyl methacrylate, ethyl methacrylate, isopropyl methacrylate, butyl methacrylate, 2 - ethylbutyl methacrylate, isobutyl methacrylate, isoamyl methacrylate, butoxyethyl methacrylate, hexyl methacrylate, heptyl methacrylate, 2 - ethylhexyl methacrylate, 3,5,5 - trimethylhexyl methacrylate, n - octyl methacrylate, isooctyl methacrylate, decyl methacrylate, isodecyl methacrylate, lauryl methacrylate, tridecyl methacrylate, 3,6,8 - trimethyl - 4 - nonyl methacrylate, stearyl methacrylate, cyclohexyl methacrylate, hydroxyethyl methacrylate, hydroxypropyl methacrylate, t-butyl amino ethyl methacrylate, dimethylaminoethyl methacrylate, 2 - hydroxy - 3 - methacryloyloxypropyltrimethylammonium chloride, glycidyl methacrylate, ethyl acrylate, isopropyl acrylate, butyl acrylate, 2-ethylhexyl acrylate, n-hexyl acrylate, n-octyl acrylate, decyl acrylate, lauryl acrylate, tridecyl acrylate and stearyl acrylate. Also useful are polymers and copolymers obtained from monomers of acrylic acid, methacrylic acid, styrene, alkyl styrene, butadiene, 2 - methyl - 1,3-butadiene, 2 - chloro - 1,3 - butadiene, 2,3 - dichloro - 1,3-butadiene; polymers and copolymers of vinyl esters such as vinyl acetate, vinyl butyrate, vinyl laurate, vinyl stearate, vinyl 2-ethylhexanoate; polymers and copolymers of vinyl halides and vinylidene halides, such as vinyl chloride, vinylidene chloride, vinyl fluoride, vinylidene fluoride, chlorotrifluoroethylene and tetrafluoroethylene; polymers and copolymers of allyl esters such as allyl propionate, or allyl caprylate; polymers and copolymers of vinyl ketones such as vinyl methyl ketone, vinyl ethyl ketone and the like; polymers copolymers of vinyl ethers such as methyl vinyl ether, cetyl vinyl ether, octadecyl vinyl ether and the like; polymers and copolymers of acrylamide, methacrylamide, N-methylol acrylamide, N-methylol methacrylamide, N-isopropylacrylamide; and acrylonitrile and methacrylonitrile.

The preferred compositions are those which contain 7 to 11 carbon atoms in the perfluorocarbon chain and mixtures of these compositions are particularly preferred.

In order to evaluate the polymers of the invention, the compositions were padded onto 80 x 80 cotton test cloth to 100% wet pickup, the swatches dried 3 minutes at 110° C. and then cured for 3 minutes at 170° C. Oil repellency values were assigned on the basis of the tests described in U.S. Ser. No. 529,937, now U.S. Pat. 3,304,278. Water repellency values were obtained from the AATCC Standard Test Method 22–1964 of the American Association of Textile Chemists and Colorists.

In order to have comparative data so as to show the unexpected effect of the branching in the hydrocarbon portion of the fluoroacrylate, the following compounds were prepared and evaluated.

EXAMPLE 16

Preparation of 2-(perfluoro-7-methyloctyl)ethyl methacrylate

A 3-liter flask fitted with stirrer, condenser, dropping funnel and thermowell is charged with 250 g., 0.4 mole, of 1 - iodo - 2 - (perfluoro - 7 - methyloctyl)ethane at 60°. To this is added 500 g. of 23% oleum during a 2 hour period while maintaining a temperature of 60–70°. The mixture becomes dark purple. After an additional ½ hour at 85°, the mass is cooled to 50° and stirred for 1.5 hours. The thick reaction mixture is then carefully poured into a mixture of 1080 g. ice, 1025 g. water and 25.5 g., 0.2 mole, of $Na_2SO_3$ and kept below 35°. This mixture is then refluxed for 1 hour.

After standing at room temperature for two days, the reaction mixture is filtered thru a sintered glass funnel and washed well with water. The solid is taken up in 1,1,2-trichlorotrifluoroethane and the solution washed several times with water, 5% $NaHCO_3$, and water. Evaporation of the solvent affords 170 g. of waxy

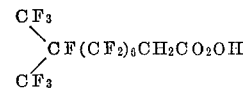

83% yield, M.P. 43°.

A 1-liter flask fitted with a phase separator is charged with 102.8 g., 0.2 mole, of the above alcohol, 34.4 g., 0.4 mole, of methacrylic acid, 4.0 g. of p-toluenesulfonic acid monohydrate, 1.0 g. of hydroquinone, and 400 ml. of xylene, and the reaction mixture refluxed for 12 hours. The xylene is then removed under vacuum at 60° and the residue is taken up in ether. The ether solution is washed with water, 1% NaOH plus 25% $Na_2CO_3$, water and dried over $MgSO_4$. Evaporation of the solvent under nitrogen affords 104 g. of semi-solid residue. Fractionation of this residue affords 67 g., 0.121 mole, of

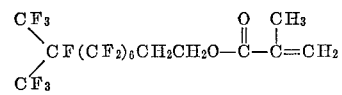

B.P. 74°/0.1 mm.

*Analysis.*—Calc'd for $C_{15}F_{19}H_9O_2$ (percent): C, 30.88; H, 1.73; F, 61.89. Found (percent): C, 30.42; H, 1.75; F, 61.25. Mass spectral and N.M.R. data are consistent with the assigned structure.

EXAMPLE 17

Preparation of 3-(perfluoro-7-methyloctyl)propyl methacrylate

A 300 ml. shaker-bomb is charged with 100 g., of 0.2 mole, of (perfluoro - 7 - methylnonyl)ethylene, 150 g., 3.58 mole, of methanol, 2.9 g., 0.02 mole, of di-tert-butyl peroxide and closed. The bomb is heated with shaking to 123° for 17 hours. The reaction mixture is removed and fractionated. The portion B.P. 88°/0.1 mm. weighs 53 g. and is

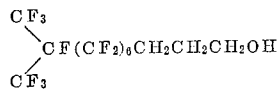

*Analysis.*—Calc'd for $C_{12}F_{19}H_7O_3$ (percent): C, 27.28; H, 1.33; F, 68.34. Found (percent): C, 27.02; H, 1.50; F, 66.85.

A 500 ml. flask equipped with a 0.25 x 3 inch column packed with copper turnings topped by a phase separator is charged with 50 g., 0.095 mole, of the above alcohol, 24.5 g., 0.285 mole, methacrylic acid, 1.0 g., of p-toluenesulfonic acid monohydrate, 0.25 g. of hydroquinone and 150 ml. toluene. The reaction mixture is refluxed for 5 hours during which time 1.9 g. 0.105 mole, water is collected in the trap.

The solvent is removed under vacuum and the residue taken up in 1,1,2 - trichlorotrifluoroethane. This solution is washed 4× 20 ml. of 10% NaOH and 1× water and dried over Drierite. Removal of the volatile solvent affords 38 g., 0.064 mole,

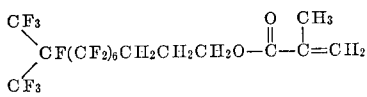

B.P. 88°/0.1 mm.

*Analysis.*—Calc'd for $C_{16}F_{19}H_{11}O_2$ (percent): C, 32.22; H, 1.85; F, 60.54. Found (percent): C, 32.11; H, 1.99; F, 60.64. $N_D^{25}$ 1.3492. The proton N.M.R. spectrum and mass spectrum of this sample are consistent with the assigned structure.

In commercial use, however, one would rarely use the fluorocarbon acrylate polymer alone, but as pointed out above, it is particularly desirable to use the fluorine containing acrylate polymers or copolymers of the invention with separately prepared non-fluorinated polymer or copolymer emulsions, and in particular with alkyl acrylate and alkyl methacrylate polymer latices. The following example illustrates the preparation of n-decyl methacrylate which is used in conjunction with the fluoroacrylate.

EXAMPLE 18

Homopolymerization of n-decyl methacrylate

A large resin flask is charged with 140 g. of deoxygenated water, 3 g. of Acetoquat CTAB, 5 g. of 60% methylolacrylamide, and 60 g. of n-decyl methacrylate. To this is added 1.2 g. of 2,2' - azodiisobutyramidine dihydrochloride dissolved in 10 ml. of water. After gentle stirring for 24 hours at 70°, there is added 0.3 g. of the amidine plus 0.2 g. tert-butyl hydroperoxide in 5 g. of water and the reaction continued for 6 hours. A latex having 24% solids is obtained along with 14 g. of polymer scrap which is filtered off.

Oil repellency values using poly - n - decylmethacrylate in the pad bath in several examples are shown in the following Table I which data was obtained by padding the various latices onto 80 x 80 cotton test cloth to 100% wet pick-up, and the swatches then dried for 3 minutes at 110° C. and cured for 3 minutes at 170° C.

TABLE I

| Example Number | Latex containing polymer of— | Percent solids in bath | Percent polydecyl methacrylate in bath | Percent "Phobotex" [a] solids in bath | Oil repellency value |
|---|---|---|---|---|---|
| 19 | $(CF_3)_2CF(CF_2)_6CH_2CH_2CH(CH_3)OC(=O)-C(CH_3)=CH_2$ [b] | 0.2 | 0.8 | | 140 |
| 20 | $(CF_3)_2CF(CF_2)_6CH_2CH_2CH_2OC(=O)-C(CH_3)=CH_2$ [c] | 0.2 | 0.8 | | 110 |
| 21 | $(CF_3)_2CF(CF_2)_6CH_2CH_2OC(=O)-C(CH_3)=CH_2$ [d] | 0.2 | 0.8 | | 110 |
| 22 | $(CF_3)_2CF(CF_2)_6CH_2CH_2CH(CH_3)OC(=O)-C(CH_3)=CH_2$ [b] | 0.5 | | 5.0 | 140 |
| 23 | $(CF_3)_2CF(CF_2)_6CH_2CH_2CH_2OC(=O)-C(CH_3)=CH_2$ [c] | 0.5 | | 5.0 | 110 |

[a] A commercial water repellant (Ciba). [b] See Example 4. [c] See Example 5. [d] See Example 6.

As can be seen from the above Table I the branched acrylate compositions of the invention give surprisingly superior oil repellency values (compare Example 19 with Examples 20 and 21 and Example 22 with Example 23). Furthermore, this effect is shown with and without additives to the pad bath.

Additional evaluations are shown in Table II, 0.4% by weight solids of the pad bath of fluorinated latex, 0.6% by weight solids of a non-fluorinated latex, and pad bath additives of 10% by weight of the bath of "Permafresh" 183 (Sun Chemical), 1.2% by weight zinc nitrate, and 5% "Norane"F (Sun Chemical) comprised the pad bath. The non-fluorinated latex as a homopolymer of 3,5,5-trimethylhexyl methacrylate prepared as follows:

A large resin flask is charged with 250 g. of deoxygenated water, 5 g. of Ethomeen LI5/15 surfactant, 3 g. of acetic acid, 8 oz. of 60% N-methylolacrylamide, and 100 g. of 3,5,5-trimethylhexyl methacrylate. At a temperature of 70° C. and with gentle stirring there is added 2 g. of 2,2'-azodiisobutyramidine dihydrochloride dissolved in 10 ml. of water. Polymerization is carried out at 70° C. for 6 hours giving a latex with 23% solids along with 20 g. of scrap which is filtered off.

TABLE II

| Example No. | Carbon atoms in $R_f$ | Fluorine containing polymer of Example— | Repellency values | | | | | |
|---|---|---|---|---|---|---|---|---|
| | | | Initial | | After 5 washes no ironing | | After 5 washes with ironing | |
| | | | Oil | Water | Oil | Water | Oil | Water |
| 24 | 11 | 7 | 140 | 100 | | | | |
| 25 | 9 | 4 | 140 | 100 | 0 | 70 | 120 | 70 |
| 26 | 7 | 8 | 110 | 100 | | | | |
| 27 | 5 | 9 | 50 | 100 | | | | |
| 28 | 3 | 10 | 0 | 100 | | | | |
| 29 | Mixture of 7, 9, and 11 | 15 | 140 | 100 | | | | |
| 30 | Copolymer of $R_f=C_9$ with n-decyl methacrylate | 11 | 130 | 100 | 70 | 80 | 100 | 70 |
| 31 | Copolymer of $R_f=C_9$ with tridecylacrylate | 12 | 120 | 100 | 80 | 50 | 100 | 70 |
| 32 | Copolymer of $R_f=C_9$ with octadecylacrylate | 13 | 130 | 100 | 110 | 80 | 120 | 70 |
| 33 | Copolymer of $R_f=C_9$ with octadecyl methacrylate | 14 | 120 | 100 | 100 | 70 | 120 | 70 |

The above Table II indicates the excellent repellent effects obtained with the fluorocarbon acrylates of the invention. Particular attention is called to Example 25 where the recovery of oil repellency after washing and ironing is indicated. Attention is also called to Example 28 which shows the absence of oil repellency effects when $R_f$ contains less than about 5 carbon atoms. The excellent repellencies of copolymers is illustrated in Examples 30 to 33.

When using a physical mixture of the fluorinated acrylate latex with a non-fluorinated acrylate latex as in the above example, the amount of the fluoropolymer latex will preferably be from about 10% to 60% by weight of solids of the total latices. When such mixtures are used and when the fluorinated acrylate latex is a copolymer, then the fluorine-free co-monomer of the copolymer will generally be from about 0.5% to about 40% by weight of the total copolymer composition.

It will be understood, of course, that numerous variations and changes may be made from the above description and examples without departing from the spirit and scope of the invention.

We claim:

1. A polymer consisting essentially of repeating units having the formula:

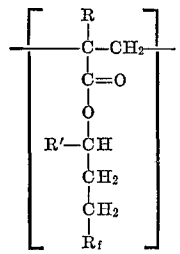

where:

$R_f$ is a perfluorocarbon group containing 5-13 carbon atoms;
R is selected from the group consisting of hydrogen and methyl; and
R' is lower alkyl.

2. Polymers as in claim 1 where different $R_f$ moieties are present and where R is methyl.

3. A copolymer of a monomer having the formula:

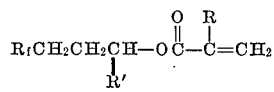

and about 0.5% to about 40% by weight of the copolymer of a fluorine-free ethylenically unsaturated monomer containing from about 3 to 22 carbon atoms; said copolymer containing the unit

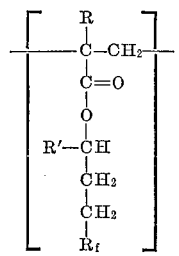

where:

$R_f$ is a perfluorocarbon group containing 5-13 carbon atoms;
R is selected from the group consisting of hydrogen and methyl; and
R' is lower alkyl.

4. A copolymer as in claim 3 where the fluorine free monomer is octadecyl acrylate.

5. A copolymer as in claim 3 where the fluorine free monomer is octadecylmethacrylate.

6. A copolymer as in claim 3 where the fluorine free monomer is n-decyl methacrylate.

7. A copolymer as in claim 3 where the fluorine free monomer is

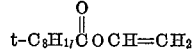

8. A copolymer as in claim 3 where the fluorine free monomer is cetyl vinyl ether.

9. A latex of a polymer of claim 1.

References Cited

UNITED STATES PATENTS

| 3,102,103 | 8/1963 | Ahlbrecht. |
| 3,282,905 | 11/1966 | Fasick et al. |
| 3,378,609 | 4/1968 | Fasick et al. |
| 3,384,627 | 5/1968 | Anello et al. |
| 3,393,186 | 7/1968 | Groves. |

HARRY WONG, Jr., Primary Examiner

U.S. Cl. X.R.

117—123, 124, 128.4, 135.5, 138.8, 139.5, 140, 142, 145, 148, 155; 260—31.2, 32.8, 33.2, 33.8, 63, 78.5; 79.3, 79.7, 83.5, 85.5, 86.1, 86.3, 86.7, 89.5, 486, 900, 901